Patented Nov. 23, 1943

2,335,012

UNITED STATES PATENT OFFICE 2,335,012

HIGH BOILING COMPOUNDS AND METHOD OF PREPARING THEM

Lotte H. Johnston, Boston, Mass., assignor to Arthur D. Little, Inc., a corporation of Massachusetts No Drawing. Original application April 12, 1941, Serial No. 388,297. Divided and this application October 15, 1941, Serial No. 415,081

7 Claims. (Cl. 252—78)

This invention, which is a division of my copending application, Serial Number 388,297, filed April 12, 1941, relates to tetra-aryl ortho silicates and methods of making them, and to their employment as high temperature heat transfer media.

Many substances have been proposed for use in place of water and steam as heat transfer media having considerably higher boiling points than water. Of these various substances, only certain low melting point metals such as mercury and lead and alloys such as Wood's metal, fused salt mixtures (e. g., "HTS"), high boiling petroleum fractions, and diphenyl oxide and certain mixtures thereof (in particular the "Dowtherms") have had any significant commercial use; and this use is limited by disadvantages inherent in each of these substances. For example, mercury is very expensive and its vapors are toxic; fused salt mixtures have relatively high freezing points (e. g., 288° F. for "HTS") and their use is thus restricted to conditions of temperature considerably above the boiling point of water, and they cannot be employed in vapor phase as heat-transfer media; essentially the same is true of lead and Wood's metal; petroleum fractions are restricted as to their upper temperature limits and will not boil without cracking, and, in addition, present fire hazards, although they have more extensive use than other non-aqueous heat-transfer media. While the diphenyl oxide type compositions are to a considerable extent free from these disadvantages, they nevertheless leave something to be desired in their range of applicability, inasmuch as they become solid at or about room temperature, and at high temperatures, e. g., around 700° F., they must be used under considerable pressure, such as 100 pounds per square inch.

In accordance with the present invention it is possible to produce, in an economical manner, a particular class of chemical compounds, which compounds are useful not only for various industrial purposes but also and especially as heat transfer media which remain liquid over an exceedingly wide temperature range at atmospheric pressure, and which may also be raised above the boiling point and the vapors used in heat transfer processes.

The class of compounds to which this invention relates is the tetra-aryl ortho silicates which are typically formed by reaction between silicon tetrachloride (SiCl₄) and those phenols whose only reactive group with respect to SiCl₄ is a single —OH group. Only the mono-hydric phenols are therefore included. These may be unsubstituted (phenol itself) or have one or more substituents which are nonreactive toward SiCl₄, e. g., methyl groups (the cresols) or other alkyl groups, ether groups (the guaiacols, etc.), or other groups which may form an additional ring or rings (the naphthols, etc.). The reaction may therefore be represented broadly by the following equation:

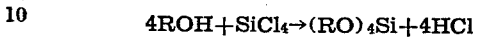

wherein ROH is a monohydric phenol (i. e., an aryl monohydroxide) and R is therefore an aryl group or radical corresponding to said monohydric phenol. The aryl group may be unsubstituted, e. g., it will be C₆H₅, when ROH is phenol, or it may have substituent organic groups attached to the ring carbons, as in the cresols and guaiacols, as long as these substituent groups are not reactive under the conditions of the process.

In carrying out the preparation of tetra-aryl ortho silicates in accordance with this invention, carefully controlled conditions are maintained in order to secure goods yields and to avoid the formation of undesirable by-products. In particular, the present process employs a considerable excess of the phenol (at least 50% excess) over that theoretically required to react with the SiCl₄ and the reaction steps, times and temperatures are controlled in such a manner that the final tetra-aryl ortho silicate product is substantially free from undesirable by-products, and the effects of any side reactions are largely overcome. The details of this process will now be described more fully in the following examples, which are to be considered as illustrative rather than limiting.

EXAMPLE I.—*Preparation of tetra-phenyl ortho silicate*

400 grams of phenol are melted and poured into a round-bottomed flask fitted with a reflux condenser and a calcium chloride tower. 120 grams of SiCl₄, filtered, are added to the phenol drop by drop over a period of several hours, with constant stirring of the mixture, which is held at a temperature sufficient to prevent any substantial crystallization of the phenol but below the boiling point of SiCl₄ (57.6° C.). The molecular ratio of phenol to SiCl₄ is therefore 6 to 1, or a 50% excess of phenol. The mixture is allowed to stand for about 24 hours in order to allow time for the reaction to proceed to a point where substantially all the SiCl₄ has been consumed in the reaction, and the temperature is then raised to about 60° C., and held there for 8 hours. This heating step presumably promotes the reaction of the excess phenol with any phenoxy silicon chlorides which may have been formed, to produce additional amounts of the tetra-phenyl ortho silicate. The temperature is then raised gradually during a further period of 8 hours to 230° C., during which time the reaction is completed. The reaction mixture is then transferred to a suitable container and distilled at atmospheric pressure, through an air condenser. Any remaining unreacted $SiCl_4$ (ordinarily there is none) and any remaining hydrogen chloride resulting from the reaction are thus driven off, together with most of the excess phenol, and the distillate consists, except for some residual phenol, entirely of tetra-phenyl ortho silicate. The residual phenol can be removed by further distillation. The tetra-phenyl ortho silicate is a yellowish, oily liquid, having a boiling point (Engler) of 407–408° C. The yield by the foregoing procedure is 204 grams, or 73% of theoretical. Properties of the product are as follows:

Boiling point: 407–408° C. (Engler).

Melting point: 48° C. after recrystallization from benzene.

Specific heat: 0.56 at temperatures above about 150° C.; 0.25 in solid state.

Latent heat, calculated by Trouton's rule: 14,070 gm. cal./mol; 35.2 gm. cal./gm.

Readily soluble in benzene, xylene, petroleum ether, acetone, and in most ordinary organic solvents. Insoluble in water (hydrolyzes to some extent).

A sample of tetra-phenyl ortho silicate was placed in a glass container and held at the boiling point in a nitrogen atmosphere at a pressure of about 1" mercury gage for six weeks, and using a long air column above the liquid to minimize evaporation losses. During that time the boiling point dropped slightly at first and became stable at 396° C.±2° C. There was no appreciable evidence of decomposition during this prolonged heating period, although toward the end of the liquid became somewhat more viscous and tended to resinify when cooled.

EXAMPLE II.—*Preparation of tetra-cresyl ortho silicate*

324 grams of U. S. P. cresol are reacted with 85 grams of $SiCl_4$ as in Example I, except that since the cresol is liquid at room temperature no warming is necessary to keep the reactants liquid. The molecular ratio of cresol to $SiCl_4$ is 6 to 1, or 50% excess of cresol. The reaction mixture is allowed to stand and is then heated, as in Example I, following which the reaction product is similarly distilled but preferably under reduced pressure (e. g., 3 mm. of mercury absolute). The tetra-cresyl ortho silicate thus produced is an orange-yellow oily liquid; yield is approximately 62% of theoretical. Properties of the product are as follows:

Boiling point: 426–430° C. (Engler).

Melting point: still liquid (but viscous) at −65° C.

Specific heat: 0.43.

Latent heat, calculated by Trouton's rule: 14,721 gm. cal./mol; 32.3 gm. cal./gm.

Soluble in benzene, acetone, ether, petroleum ether, and in most ordinary organic solvents. Insoluble in water.

A sample of tetra-cresyl ortho silicate as thus produced was placed in a glass container and held at the boiling point in the same manner as described in connection with the phenyl compound described under Example I. Over a period of four weeks the boiling point held at 385° C.±3°. As in the case of the corresponding phenyl compound, there was no appreciable evidence of decomposition, and there was a slight tendency toward the end of the period for the liquid to resinify on cooling.

Methods similar to those described in Examples I and II can be used for preparing other tetra-aryl ortho silicates. Due to the relatively low boiling point of $SiCl_4$, however, it is generally advantageous to employ a solvent for the phenol when the phenol has a melting point above the boiling point of $SiCl_4$, in order that the reaction may be carried out in liquid phase at a low enough temperature. Thus, when the phenol is naphthol, ethyl ether may be used as the solvent. The solvent must, of course, be nonreactive with the reagents and the products, and should preferably be a solvent for the $SiCl_4$ as well as for the phenol.

It is not necessary to use pure single compounds as the phenols for carrying out this procedure. Thus, in Example II, ordinary cresylic acid (a mixture of various cresols and some phenol) may be used. However, it is preferable that any such impure materials be free from any substances which will enter into the reaction unfavorably.

It is clear from the properties of the tetraphenyl and -cresyl ortho silicates as above described that these compounds are useful as high boiling heat transfer media. They are particularly advantageous over known compounds for this purpose in their high boiling points at atmospheric pressure (respectively 396° and 385° C., or 745° and 725° F.), which are, as far as I am aware, well above those of any organic substances which are normally liquid or can be liquefied by heat without decomposition. These boiling points are even above that of mercury (357° C.), and among heat transfer media are exceeded only by those of some of the fused salt mixtures and fused metals, which, as already stated, have quite high melting points and are solid at ordinary temperatures and even above the boiling point of water.

These new heat transfer media way, for example, be used advantageously in indirect heat-transmitting contact with substances which it is desired to heat. Thus, these heat transfer media may be heated in any appropriate manner, as in a boiler, and then conveyed to the locality of the substance to be heated and brought into out-of-contact heat exchange therewith in any appropriate device; the cooled heat transfer medium is then returned to the boiler for reheating.

Another noteworthy feature of the tetra-cresyl ortho silicate is its very low melting point. It does not solidify even at the temperature of ordinary freezing mixtures of solid $CO_2$ and organic solvents (about −65° C.) and hence is liquid over a range of at least 450° C. (810° F.) at atmospheric pressure, which range is not exceeded by any organic liquid of which I am aware. Hence the tetra-cresyl ortho silicate may be used as a heat-transfer medium not only for high temperature operations, but also in medium and even in ordinary low temperature heat exchange processes, without freezing in the system.

The tetra-phenyl ortho silicate, however, is solid at room temperature, and must be kept above about 48° C. (about 118° F.) to avoid freezing.

It has also been noted as mentioned above that the tetra-phenyl and -cresyl ortho silicates have a tendency toward resinification, if kept at the boiling point for several weeks.

It is now further found, in accordance with the present invention, that this tendency toward resinification can be largely, if not wholly, eliminated by using mixtures of tetra-aryl ortho silicates with each other or even with other compatible organic silicates. Also, by employing such mixtures, the freezing (melting) points of the higher melting tetra-aryl ortho silicates can be reduced sufficiently so that they do not solidify even at room temperatures.

For example, four parts by weight of tetra-phenyl ortho silicate and one part of tetra-cresyl ortho silicate are mixed and heated to boiling. This mixture remains permanently liquid at temperatures down to at least about 20° C.; no part of it crystallizes out even on seeding. Such a mixture was held at the boiling point at atmospheric pressure for over two months without any indication of decomposition or resinification. The boiling point during this period was 377° C.±5° C. More tetra-cresyl ortho silicate may be used, if desired, even up to 100% of the total mixture; but if the amount of tetra-cresyl ortho silicate is much less than that given (i. e., much less than 20% of the whole), there is an increasing tendency for the tetra-phenyl ortho silicate to crystallize out at the lower temperatures. Thus, with about 15% or less of tetra-cresyl ortho silicate, some of the phenyl compound crystallizes out at room temperature, at least on seeding.

In a similar manner, other compatible organic silicates may be mixed with any of the tetra-aryl ortho silicates or with mixtures of them. Thus, when 15 parts by weight of tetra-ethyl ortho silicate $(C_2H_5O)_4Si$ are mixed with 85 parts by weight of tetra-phenyl ortho silicate, and the mixture is heated, it remains permanently liquid at room temperature even on seeding. Such a mixture, held at the boiling point for over six weeks, showed no sign of either decomposition or resinification. The boiling point during this period was 371° C.±10° C. Any substantial reduction in the proportion of tetra-ethyl ortho silicate results in more or less crystallizing out of tetra-phenyl ortho silicate at room temperature.

Other organic silicates, such as other tetra-alkyl ortho silicates, may be used in the same manner as tetra-ethyl ortho silicate, in carrying out the present invention, so long as they are compatible with the tetra-aryl ortho silicates herein described, under the conditions imposed.

In the preparation of the tetra-aryl ortho silicates, other starting materials than $SiCl_4$ may be used. Thus, other tetra-halides of silicon than $SiCl_4$, such as $SiBr_4$, may be used as starting materials for reaction with the phenols. Also, some of the intermediate products already referred to in Example I, i. e., the aryl-oxy silicon halides, may be reacted with the phenols to give the tetra-aryl ortho silicates of this invention.

It is to be understood that this disclosure is for the purpose of illustration, and that various changes and modifications may be made without departing from the spirit and scope of the invention as set forth in the appended claims.

I claim:

1. A composition of matter, which comprises principally tetra-phenyl ortho silicate together with a smaller but substantial amount of tetra-cresyl ortho silicate.

2. A composition of matter, which comprises principally a tetra-aryl ortho silicate having the formula $(RO)_4Si$ wherein R is an aryl group corresponding to a monohydric phenol of the formula ROH, and a smaller amount of another organic silicate miscible therewith for lowering the melting point, the latter silicate being selected from the group consisting of tetra-aryl ortho silicates having the formula just defined, and tetra-alkyl ortho silicates.

3. A composition of matter, which comprises principally tetra-phenyl ortho silicate and a smaller amount of an alkyl silicate miscible therewith.

4. In a process for transmitting heat to fluids in indirect contact with heat transmitting material, the step of employing as the heat transmitting material a tetra-aryl ortho silicate having the formula $(RO)_4Si$, wherein R is an aryl group corresponding to a monohydric phenol of the formula ROH.

5. In a process for transmitting heat to fluids in indirect contact with heat transmitting material, the step of employing as the heat transmitting material tetra-cresyl ortho silicate.

6. A heat transfer medium which consists principally of compatible organic silicates selected from the group consisting of tetra-alkyl ortho silicates and tetra-aryl ortho silicates, the latter having the formula $(RO)_4Si$, wherein R is an aryl group corresponding to a monohydric phenol of the formula ROH, at least one of said compatible organic silicates being one of said tetra-aryl ortho silicates.

7. In the process for transmitting heat to fluids in indirect contact with heat transmitting material, the step of employing as the heat transmitting material a composition which consists principally of a plurality of compatible organic silicates selected from the group consisting of tetra-alkyl ortho silicates and tetra-aryl ortho silicates, the latter having the formula $(RO)_4Si$, wherein R is an aryl group corresponding to a monohydric phenol of the formula ROH, at least one of said compatible organic silicates being one of said tetra-aryl ortho silicates.

LOTTE H. JOHNSTON.